(12) United States Patent
Nyberg et al.

(10) Patent No.: US 9,571,546 B2
(45) Date of Patent: Feb. 14, 2017

(54) MEDIA BROKER SERVER, METHOD, COMPUTER PROGRAM AND COMPUTER PROGRAM PRODUCT FOR MATCHING A MEDIA SOURCE AND A MEDIA RECEIVER

(75) Inventors: Marcus Nyberg, Hägersten (SE); Peter Gomez, Stockholm (SE); Cristian Norlin, Stockholm (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 711 days.

(21) Appl. No.: 13/994,151

(22) PCT Filed: Dec. 23, 2010

(86) PCT No.: PCT/EP2010/070688
§ 371 (c)(1),
(2), (4) Date: Jun. 14, 2013

(87) PCT Pub. No.: WO2012/084058
PCT Pub. Date: Jun. 28, 2012

(65) Prior Publication Data
US 2013/0275616 A1  Oct. 17, 2013

(51) Int. Cl.
*H04L 29/06* (2006.01)
*H04N 21/222* (2011.01)
*H04N 21/239* (2011.01)
*H04N 21/258* (2011.01)
*H04W 64/00* (2009.01)
(Continued)

(52) U.S. Cl.
CPC ........ *H04L 65/60* (2013.01); *H04L 65/4084* (2013.01); *H04L 65/4092* (2013.01); *H04L 67/18* (2013.01); *H04L 69/24* (2013.01); *H04N 21/222* (2013.01); *H04N 21/2393* (2013.01);
(Continued)

(58) Field of Classification Search
None
See application file for complete search history.

(56) References Cited

U.S. PATENT DOCUMENTS 7,779,444 B2   8/2010 Glad
2007/0199076 A1  8/2007 Rensin et al.
(Continued)

FOREIGN PATENT DOCUMENTS

WO   2008013768 A2   1/2008

*Primary Examiner* — Azizul Choudhury
(74) *Attorney, Agent, or Firm* — Patents on Demand, P.A.; Brian K. Buchheit; Scott M. Garrett

(57) ABSTRACT

It is presented a method for matching a media source and a media receiver. The method comprises the steps of: receiving position messages from a plurality of media sources, the position messages comprising geographic position data indicating a geographic position of each respective media source; receiving a request media message from the media receiver, the request media message comprising desired geographic position data indicating a desired geographic position of a media source; creating a matching group comprising all matching media sources of the plurality of media sources, which matching media sources are in a geographic position matching the desired geographic position; forwarding a live media stream, captured by at least one of the matching media sources of the matching group, to the media receiver; and maintaining the matching group. A corresponding media broker server, computer program and computer program product are also presented.

25 Claims, 6 Drawing Sheets

(51) Int. Cl.
*H04N 21/658* (2011.01)
*H04L 29/08* (2006.01)
(52) U.S. Cl.
CPC ... *H04N 21/25841* (2013.01); *H04N 21/6581* (2013.01); *H04W 64/00* (2013.01)

(56) References Cited

U.S. PATENT DOCUMENTS

| | | | |
|---|---|---|---|
| 2008/0271072 A1* | 10/2008 | Rothschild | H04H 60/50 725/35 |
| 2009/0094649 A1* | 4/2009 | Patel | G08B 13/19641 725/86 |
| 2009/0148124 A1 | 6/2009 | Athsani et al. | |

* cited by examiner

MEDIA BROKER SERVER, METHOD, COMPUTER PROGRAM AND COMPUTER PROGRAM PRODUCT FOR MATCHING A MEDIA SOURCE AND A MEDIA RECEIVER

TECHNICAL FIELD

The invention relates to matching a media source and a media receiver and forwarding a live media stream from the media source to the media receiver.

BACKGROUND

It has become more and more common that mobile phones have an integrated high-quality video camera as well as positioning equipment such as a GPS (global positioning system) receiver. Also, other types video recording devices, such as lap top computers or tablet computers, can carry information about location while having a connection to a network such as the Internet.

The U.S. Pat. No. 7,779,444 presents a video on request ("VOR") system. The VOR system includes a producer having a location device for providing location data and a video recording device. The VOR system also includes an information exchange having a producer database configured to store a producer profile having current location and status of the producer. The current location and status are continually updated based on the location data. The VOR system also includes a viewer having access to the information exchange to search the producer database for available producers within a predetermined range of a desired location. Upon finding the available producer at the desired location, the viewer requests an information segment to be produced by the producer from the desired location. The producer thereafter records the information segment and transmits the information segment to the viewer.

However, the disclosed patent does not handle a situation when a producer becomes unavailable or in any other way does not continue to provide the information segment. The viewer would in that case again have to access to the information exchange to find a new suitable producer. This is at best tedious and cumbersome and can in more problematic cases cause a viewer to completely lose out on a critical part in the desired information segment.

SUMMARY

It is an object of embodiment herein to reduce traffic when requests are not allowed.

According to a first embodiment, it is presented a media broker server for matching a media source and a media receiver. The media broker server comprises: a message receiver arranged to receive position messages from a plurality of media sources, the position messages comprising geographic position data indicating a geographic position of each respective media source, the message receiver further being arranged to receive a request media message from the media receiver, the request media message comprising desired geographic position data indicating a desired geographic position of a media source; a group manager arranged to create a matching group comprising all matching media sources of the plurality of media sources, which matching media sources are in a geographic position matching the desired geographic position; and a media stream forwarder arranged to forward a live media stream, captured by at least one of the matching media sources of the matching group, to the media receiver.

By using matching groups capable of containing more than one media source, a more secure source of media is provided. For example, if one media source becomes unavailable, another media source in the matching group can take over being the source to the media receiver. Additionally, using the media broker server, anonymity can be provided between the media source and the media receiver, in either or both directions.

The group manager may be arranged to consider it a match when at least one capability of the media source in question matches at least one respective desired capability requested by the media receiver. By considering media source capabilities, the media receiver can select an appropriate media source using other characteristics, if more than one is available at the desired location.

The at least one capability may include a media quality of the respective media source.

The at least one capability may include a bandwidth of at least part of a connection between the respective media source and the media broker server.

The media stream forwarder may be arranged to forward a live media stream from the one of the matching media sources of the matching group which best satisfies evaluation criteria from the media receiver.

The group manager may further be arranged to, when a first matching media source becomes unavailable for streaming media, remove the first matching media source from the matching group.

The group manager may further be arranged to, when a second matching media source no longer matches the desired geographic position, remove the second matching media source from the matching group.

The group manager may further be arranged to, when a new media source matches the desired geographic position, add the new media source to the matching group.

The group manager may further be arranged to query each matching media source whether to accept being a media source and only add media sources which have accepted being a media source to the matching group.

This dynamic updating of the matching group allows for an updated list of potential or actual media sources for the media receiver.

The group manager may be arranged to consider it a match when a distance between the geographic position of the media source in question and the desired geographic position is less than a threshold distance.

The media stream forwarder may further be arranged to process the media stream, comprising transcoding the media stream to a format acceptable to the media receiver.

The request media message may comprise a reference to mobile object to be tracked, the mobile object having the desired geographic position data indicating a desired geographic position of a media source; and the group manager may be arranged to update the matching group with removed and added media sources to maintain matching media sources with reference to the mobile object.

A movement predictor may be arranged to predict movement of the mobile object, and the group manager may be arranged to query a predicted media source, predicted to match a future geographic position of the mobile object, whether to accept being a media source.

A second embodiment is a method for matching a media source and a media receiver. The method comprises the steps, performed in a media broker server, of: receiving position messages from a plurality of media sources, the position messages comprising geographic position data indicating a geographic position of each respective media source; receiving a request media message from the media receiver, the request media message comprising desired geographic position data indicating a desired geographic position of a media source; creating a matching group comprising all matching media sources of the plurality of media sources, which matching media sources are in a geographic position matching the desired geographic position; forwarding a live media stream, captured by at least one of the matching media sources of the matching group, to the media receiver; and maintaining the matching group.

The step of creating a matching group may involve considering it a match when at least one capability of the media source in question matches at least one respective desired capability requested by the media receiver.

In the step of creating a matching group, the at least one capability may include a media quality of the respective media source.

In the step of creating a matching group, the at least one capability may include a bandwidth of at least part of a connection between the respective media source and the media broker server.

The step of forwarding may forwards a live media stream from the one of the matching media sources of the matching group which best satisfies evaluation criteria from the media receiver.

The step of maintaining the matching group may further comprise, when a first matching media source becomes unavailable for streaming media, removing the first matching media source from the matching group.

The step of maintaining the matching group may further comprise, when a second matching media source no longer matches the desired geographic position, removing the second matching media source from the matching group.

The step of maintaining the matching group may further comprise, when a new media source matches the desired geographic position, adding the new media source to the matching group.

The method may further comprise the step of querying each matching media source whether to accept being a media source and only media sources which have accepted being a media source are added to the matching group.

The step of creating a matching group may involve considering it a match when a distance between the geographic position of the media source in question and the desired geographic position is less than a threshold distance.

The step of forwarding may comprise processing the media stream, comprising transcoding the media stream to a format acceptable to the media receiver.

In the step of receiving a request media message, the request media message may comprise a reference to mobile object to be tracked, the mobile object having the desired geographic position data indicating a desired geographic position of a media source; and the matching group may be updated with removed and added media sources to maintain matching media sources with reference to the mobile object.

A movement of the mobile object may be predicted, and the step of querying a media source whether to accept being a media source, may be performed for a predicted media source predicted to match a future geographic position of the mobile object.

A third embodiment is a computer program for a media broker server for matching a media source and a media receiver. The computer program comprises computer program code which, when run on the media broker server causes the media broker server to: receive position messages from a plurality of media sources, the position messages comprising geographic position data indicating a geographic position of each respective media source; receive a request media message from the media receiver, the request media message comprising desired geographic position data indicating a desired geographic position of a media source; create a matching group comprising all matching media sources of the plurality of media sources, which matching media sources are in a geographic position matching the desired geographic position; forward a live media stream, captured by at least one of the matching media sources of the matching group, to the media receiver; and maintain the matching group.

A fourth embodiment is a computer program product comprising a computer program according to the third embodiment and computer readable means on which the computer program is stored.

It is to be noted that any feature of the first, second, third, and fourth embodiments may, where appropriate, be applied to any other of these embodiments.

Generally, all terms used in the application are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
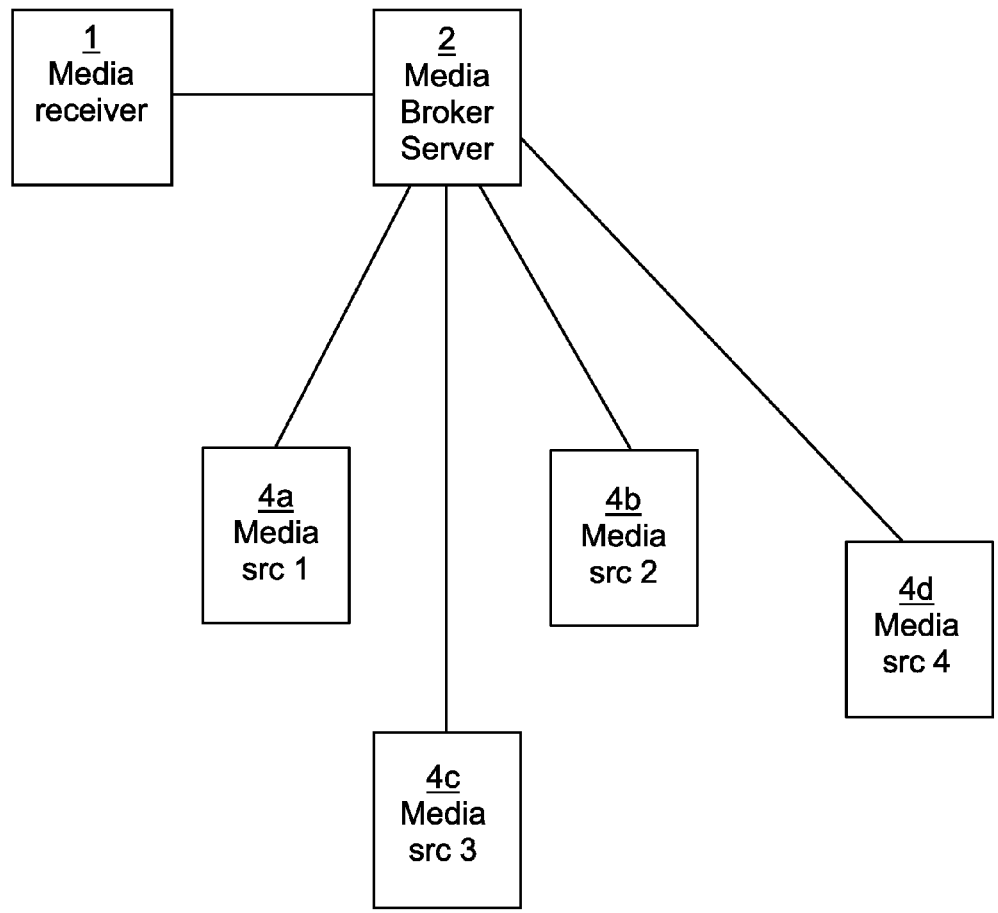
FIG. 1 is a schematic diagram showing an overview of an environment where embodiments of the invention can be applied.

FIG. 1 is a schematic diagram showing an overview of an environment where embodiments of the invention can be applied. A media receiver 1 is connected to a media broker server 2, e.g. using a wide area network such as the Internet.

The media broker server 2 is in turn connected to a plurality of media sources 4a-d, using a wide area network such as the Internet. While the environment shown in FIG. 1 includes four media sources 4a-d, any number of media sources can be used.

The media receiver 1 can be any device capable of receiving streaming media, e.g. a personal computer, a mobile (cellular) phone, a tablet computer, etc.

The media sources 4a-d can each be any device capable of capturing and providing streaming media e.g. using a camera and/or microphone, and that are capable of providing position data. For example, each media source can a mobile (cellular) phone, a tablet computer, a lap top computer, etc. The different media sources do not need to be (but could be) of the same type. The different media sources can have different capabilities in terms of video and/or audio quality.

Figure 2A:
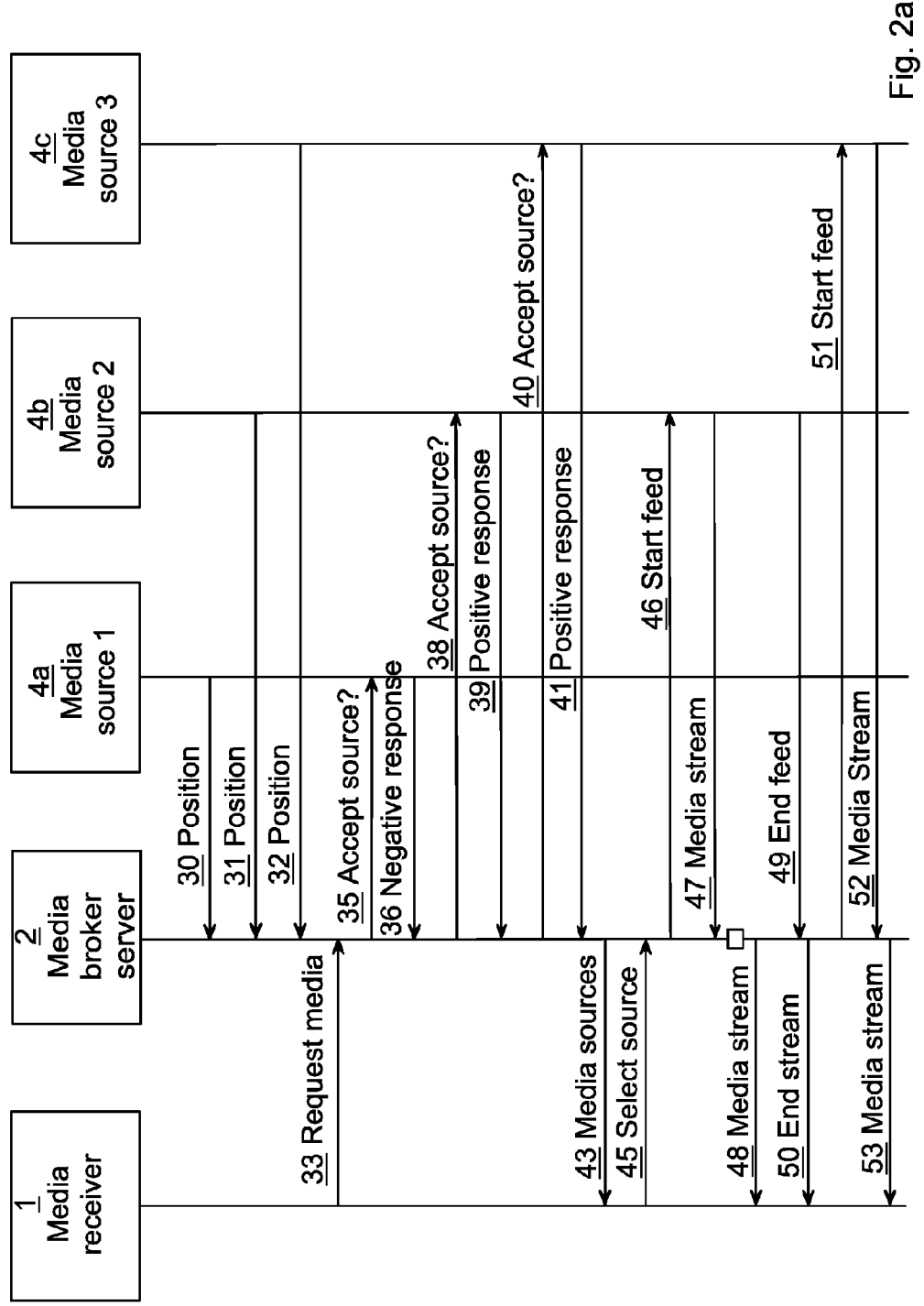
FIGS. 2A and 2B are sequence diagrams illustrating communication in embodiments between the components of FIG. 1 to match a media source and a media receiver.

FIG. 2A is a sequence diagrams illustrating communication in embodiments between the components of FIG. 1 to match a media source and a media receiver. All communication can e.g. occur using IP (Internet Protocol). In one embodiment, all signalling is performed over HTTP (Hypertext Transport Protocol), and only the media streaming occurs over a different protocol such as UDP (User Datagram Protocol), or indeed also over HTTP.

The media broker device 2 receives position messages 30, 31, 32 from one ore more media sources. In this example, three position messages 30, 31, 32 are received from three respective media sources 4a, 4b, 4c. Each position message includes geographic position data indicating the geographic position of each respective media source. For example, the geographic position data from each media source can comprise latitude and longitude co-ordinates obtained e.g. through triangulation or an integrated GPS (global positioning service). While only three position messages are shown here, the media broker server 2 repeatedly receives position messages from media sources to be able to maintain a table with positions of all active media sources. Optionally, the position messages include media capability data of each respective media source. The media capability data can include media quality data indicating the quality that the respective media source can provide, such as video resolution, bit rate, encoding format, current bandwidth, current radio coverage, rating from previous media receivers and/or any other parameters that affect the quality of the media. This media quality of the media capabilities can apply to audio and/or video media.

The media receiver 1 at some point sends a request media message 33. The request media message comprises desired geographic position data indicating a desired geographic position of a media source, e.g. a source for video and/or audio footage. For example, the user of the media receiver could be interested in a current event occurring at a particular location, e.g. for news footage.

Based on the desired geographic position, the media broker server 2 creates a matching group comprising all matching media sources. The matching media sources are thus in a geographic position matching the desired geographic position, e.g. determined by distance to the exact desired geographic position. In the example here, all media sources 4a-c shown here are determined to be matching media sources.

The media broker server 2 then proceeds to send an accept source message 35 to media source one 4a. In one embodiment, media source one 4a can ask its user whether to accept being a media source. Alternatively, the media source is configured to accept or reject queries for being a media source. In this example, media source one determines that it is to reject the accept source query and thus sends a negative response 36. Subsequently, the media broker server 2 sends an accept source message 38 to media source two 4b and receives a positive response 39. The media broker server 2 then sends an accept source message 40 to media source three and receives a positive response 10.

The media broker server 2 now has two media sources (media source two 4b and media source three 4c) available for the media consuming device 1. The media broker 2 then sends a media sources message 43 to the media consuming device comprising the list of two available media sources. The user of the media receiver 1 selects media source two 4b, after which the media receiver 1 responds with a select source message 45. The select source message in comprises a reference to media source two 4b. At this point, the media broker server 2 sends a start feed message 46 to media source two 4b. Media source two 4b then starts a live media stream 47, being video and/or audio, to the media broker server 2. The media broker server 2 can in this way optionally transcode the media stream 47. The media broker server 2 then forwards a media stream 48 to the media receiver, where the media stream 48 corresponds to the media stream 47 received from media source two 4b.

If media source two 4b is unable to continue the feed, media source two 4b sends an end feed message 49 to the media broker server 2 which then sends an end stream message 50 to the media receiver 1. The reason for media source two becoming unable to continue the feed can for example be that the media source two 4b is required for other uses, e.g. for phone calls if the media source two 4b is a mobile phone. Alternatively, the user of media source two simply wants to stop sending the media stream.

Since no media stream is now provided to the media receiver 1, the media broker server 2 sends a start feed message 51 to media source three, which can then start sending a live media stream 52 to the media broker server 2. The media broker server 2 then forwards a corresponding live media stream 53 to the media receiver 1. In this way, the media receiver 1 is automatically provided a new live media stream 53 to replace the previous media stream 48. This significantly reduces any time that the media receiver does not receive any live media stream if a currently active media source stops providing the live media stream.

It is thus shown that by keeping a group of media sources, the media broker server is able to provide a better and more reliable service to the media receiver 1.

Moreover, by using the media broker server 2, the media receiver is greatly assisted in the filtering of media sources. This filtering can, as shown, comprise consideration of capabilities of media sources.

Additionally, using the media broker server, anonymity can optionally be provided between the media source and the media receiver, in either or both directions.

Furthermore, in one embodiment it is possible that the media receiver can select multiple sources and thus get multiple concurrent media streams from the multiple media sources, as forwarded by the media broker server 2.

Figure 2B:
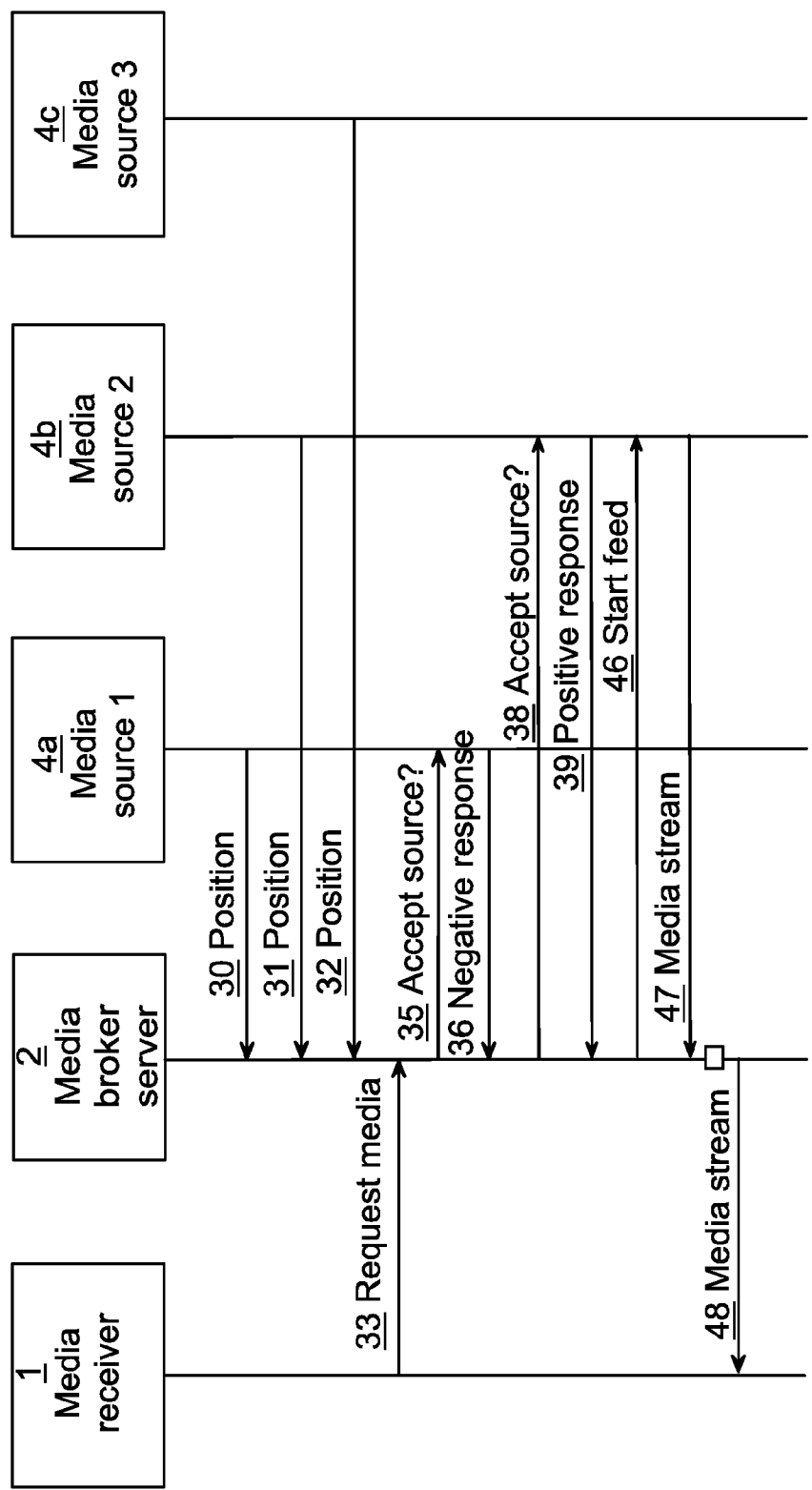

FIG. 2B is a sequence diagrams illustrating communication in embodiments between the components of FIG. 1 to match a media source and a media receiver in a simplified embodiment. All steps in FIG. 2B correspond to those in FIG. 2A. In FIG. 2B, however, once a positive response 29 has been received by a media source, media source two 4b in this example, the media broker server 2 sends the start feed message to the media source two 4b. In other words, the feed starts automatically as soon as the first matching media source accepts to provide the media.

Figure 3:
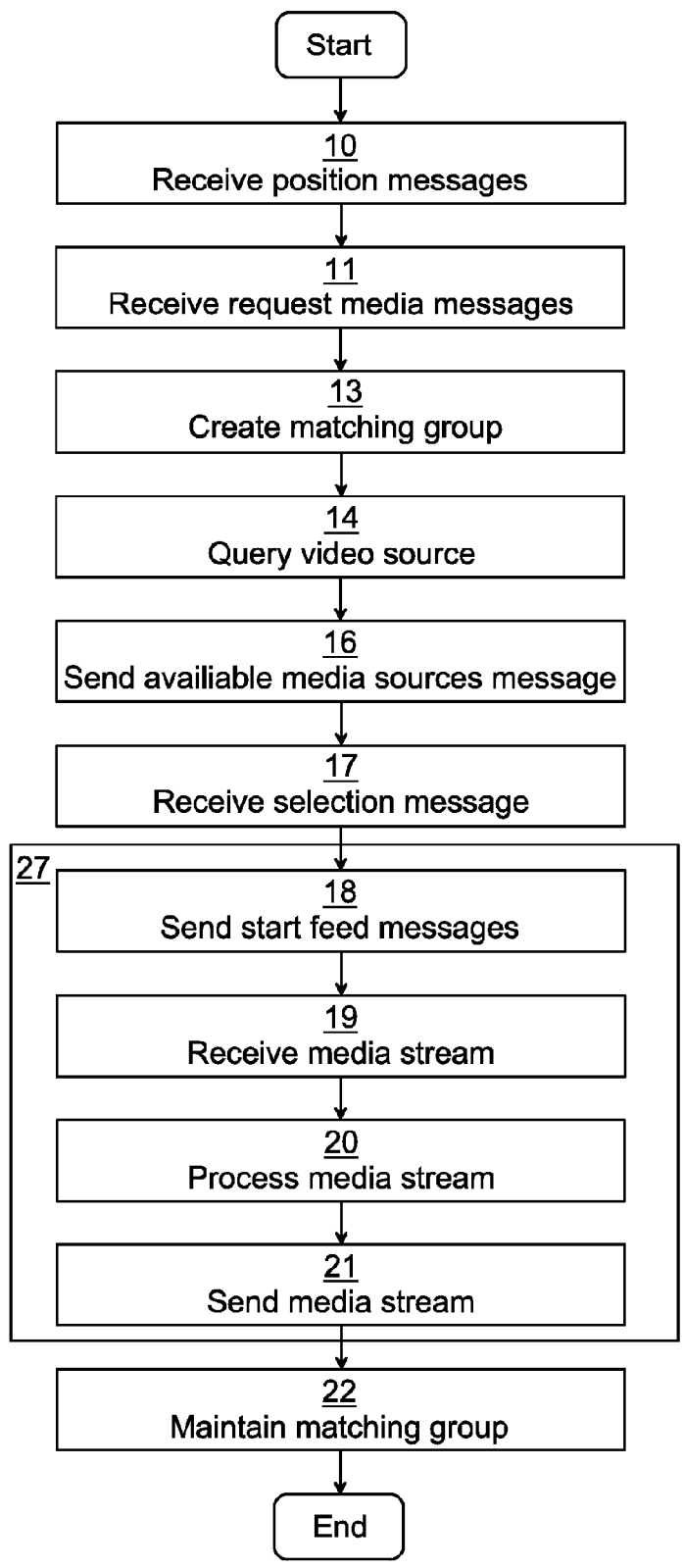
FIG. 3 is a flow chart illustrating an embodiment of a method implemented in the media broker server of FIG. 1.
Figure 6:
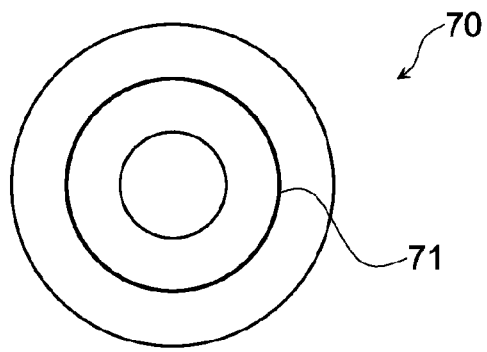
FIG. 6 shows one example of a computer program product comprising computer readable means.

FIG. 3 is a flow chart illustrating an embodiment of a method implemented in the media broker server of FIG. 1. The method corresponds to the communication of the media broker server 2 of FIGS. 2A and 2B. The method can be implemented using a computer program as depicted in FIG. 6.

In a receive position messages step 10, the position messages are received from a plurality of media sources, such as media sources 4a-j of FIG. 4. Each position message comprises geographic position data indicating a geographic position of each respective media source. Optionally, a media quality of each respective media source can be included in the position messages.

The media sources can be maintained in the media broker server in a table according to the illustrative example in table 1 below.

TABLE 1

| Media sources | | | |
|---|---|---|---|
| Media source | Location | Resolution | Total bit rate |
| x | a | 640 × 480 | 500 |
| y | b | 320 × 240 | 150 |
| z | c | 640 × 480 | 500 |

Table 1 can be expanded to accommodate more quality parameters.

In a receive request media message step 11, the request media message is received from the media receiver 1. The request media message comprises desired geographic position data indicating a desired geographic position of a media source, i.e. an indication of in what region media sources are of interest. Optionally, the request media message comprises a threshold distance, such that media sources only within the threshold distance from the desired geographic location are to be considered a match. This allows the media receiver 1 to adjust range of interest depending on the reason for the media stream. Optionally, the request media message comprises a desired capabilities of the media receiver. In an optional embodiment for tracking a mobile object, the request media message comprises a reference to mobile object to be tracked. The mobile object thus has the desired geographic position data indicating a desired geographic position of a media source. In other words, the reference is to an object which is updated with geographic positions of the mobile object over time. Optionally, the media receiver can arrange for higher priority media streaming, e.g. by paying for a premium service.

In a create a matching group step 13, a matching group is created which comprises all matching media sources. The matching media sources are in a geographic position which matches the desired geographic position. It can be considered to be a match when a distance between the geographic position of the media source in question and the desired geographic position is less than a threshold distance. Optionally, it is considered a match when also a capability of the media source in question matches a desired capability of the media receiver. In other words, the geographic position is always a factor in determining whether a media source is a match or not while the capability of the media source is an optional aspect. Capability can for example be media quality such as resolution, bit rate, encoding format, or a connection measurement such as current bandwidth, current radio coverage, or even a subjective capability such as a rating from previous media receivers and/or any other parameters that reflect the capability of the media source. Filtering the matching group using the capabilities can for instance be performed before finding media sources matching the desired geographic location, or after having received responses from the media sources as part of the querying. Alternatively or additionally, this filtering can even be performed while the live media stream is being received.

In an optional query media source step 14, each media source of the matching group is queried whether to accept being a media source. The matching group can thus be filtered to only include media sources which have accepted being a media source.

Optionally, once the matching group has been created, the media broker server, in a send available media sources message step 16, sends the media sources message to the media receiver. The media sources message comprises a list the available media sources of the matching group. The matching group can be maintained in the media broker server in a table according to the illustrative example in table 2 below.

TABLE 2

| Matching groups | | |
|---|---|---|
| Group ID | Media receiver | Media source |
| 1 | i | a |
| 1 | i | c |
| 2 | ii | a |
| 2 | ii | b |
| 2 | ii | c |

As seen in table 2, several groups can exist concurrently for different media receivers. Also, each media source can stream live media to more than one media receiver.

If a more automatic method is performed, the media stream simply is started once a matching media source has been found. This allows for a more automatic system, at the expense of less choice of media source for the media receiver. Alternatively, the group can comprise more than one entry, and media stream is started from the matching media source which best satisfies evaluation criteria from the media receiver. The evaluation criteria can for example be communicated in the request media message, or the criteria can be pre-configured in the media broker server 2 for the particular media receiver or globally. For example, the media source can be selected which is closest to the desired geographic position, or has the highest video resolution.

If the optional send available media sources message step 16 was executed, a receive selection message step 17 is also executed. Here, the selection of media source or media sources is received from the media receiver in the selection message.

At this point, in a forward live media stream step 27, the live media stream from one or more media sources, matching the selection message, is forwarded to the media receiver.

The forward live media stream step 27 can comprise a send start feed message step 18, a receive media stream step 19 a process media stream step 20 and a send media stream step 21. These steps are executed repeatedly or even concurrently during the duration of live media streaming. Optionally, if the media receiver is configured to receive higher priority media streaming, the media broker server 2 can here send a request to a mobile network operator of the one or more selected media sources. In this way, the mobile network operator can increase the priority of live media streaming from the one or more selected media sources to improve quality of the live media stream(s) received by the media receiver.

In the send start feed message step 18, a start feed message is sent to the one or more selected media sources. The media stream is then received from the selected media source/sources in the receive media stream step 19.

In the optional process media stream step 20, the media stream can for example be transcoded to a format which is acceptable to the media receiver. Optionally, the live media stream can be recorded in this step to allow access to the live media stream at a later stage.

Subsequently, the media stream is sent to the media receiver in the send media stream step 21.

In a maintain matching group step 22, the matching group is maintained. For example, when a matching media source which is part of the matching group becomes unavailable for streaming media, such a media source is removed from the matching group. Also, when a matching media source no longer matches the desired geographic position or desired capability, this can be removed from the second matching media source from the matching group. Furthermore, when a new media source matches the desired geographic position and optionally desired capability, this media source can be added to the matching group.

In the optional embodiment for tracking a mobile object, the matching group is updated over time, removing and adding media sources to maintain media sources which match the mobile object. In that situation, the movement of the mobile object can sometimes be predicted, whereby predicted media sources can be queried in advance whether to accept being a media source, where predicted media source are predicted to match a future geographic position of the mobile object. This allows predicted media sources to be available quicker once the mobile object is in a position such that the predicted media source in question matches the location of the mobile object.

FIG. 4A-D are schematic diagrams illustrating the selection of one or more media sources for a media receiver of FIG. 1. This is to illustrate how the matching group is maintained in relation to a desired geographic location.

Figure 4A:
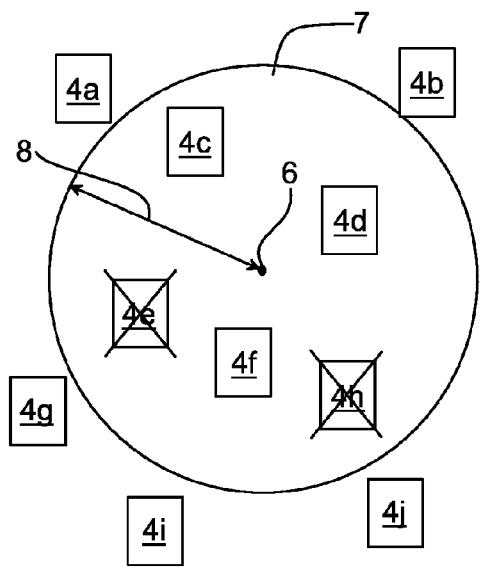
FIG. 4A-D are schematic diagrams illustrating the selection of one or more media sources for a media receiver of FIG. 1.

In FIG. 4A, media sources 4*a-j* are scattered geographically. A media receiver 1 (not shown here) would like to receive a live media stream from the desired geographic location 6, as described above. A threshold distance 8 defines a radius of a circle around the desired geographic location 6, within which all media sources 4*c*, 4*d*, 4*f* being part of the matching group 7 are included. In this example, media sources 4*e* and 4*h* are not part of the matching group even though they geographically match the desired geographic location 6, as defined together with the threshold distance 8. The reason for this can for example be that media source 4*e* did not accept a query to be a media source and that the capability defined as a quality of a live media stream from media source 4*h* does not match a desired capability including the quality as requested by the media receiver. Hence, the media sources 4*c*, 4*d* and 4*f* form the matching group 7.

Figure 4B:
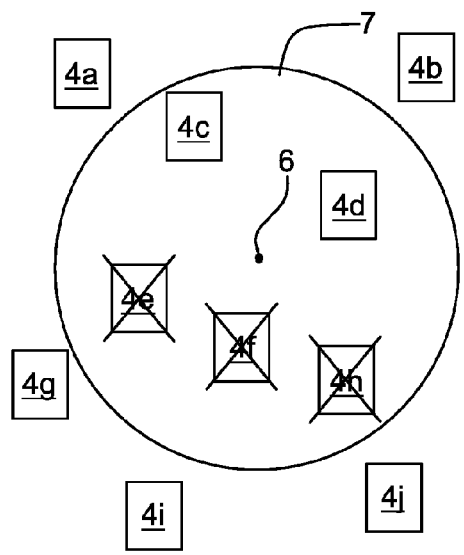

FIG. 4B shows a scenario of the situation illustrated in FIG. 4A, some time later. The dynamic behaviour of the matching group 7 is illustrated by media source 4*f* no longer being part of the matching group 7. This can for example be due to the media source 4*f* being turned off or that the user of the media source 4*f* no longer would like to provide the live media stream.

Figure 4C:
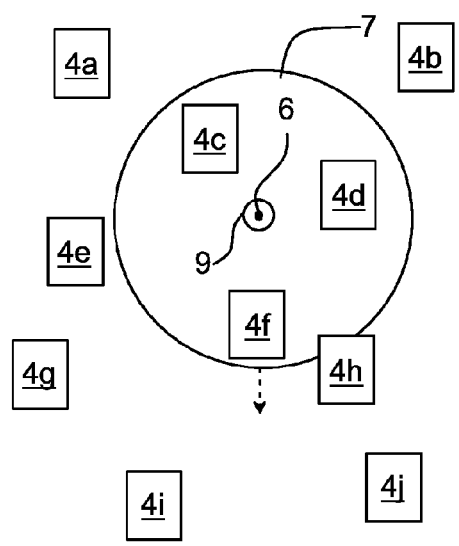
Figure 4D:
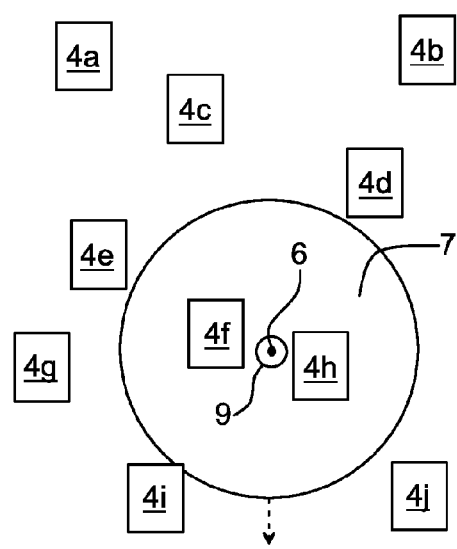

FIGS. 4C and 4D illustrate an embodiment where a mobile object 9 is to be tracked. The mobile object 9 thus defines and is coupled to the desired geographic position 6 and thereby defines the geographic scope of the matching group 7. In FIG. 4C, the matching group contains media sources 4*c*, 4*d* and 4*f*. In FIG. 4D, the mobile object 9 has moved, thereby the geographic scope of the matching group 7 has moved and now only includes media sources 4*f* and 4*h*.

Optionally, the media broker server 2 predicts the movement of the mobile object 9, and can thereby already at the time reflected in FIG. 4C prepare media source 4*h* by querying whether media source 4*h* will accept to be a media source.

Figure 5A:
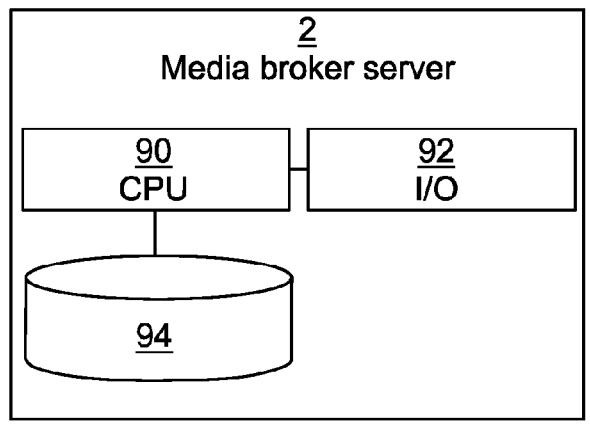
FIG. 5a is a schematic diagram of components of the media broker server of FIG. 1.

FIG. 5A is a schematic diagram of components of the media broker server 2 of FIG. 1. A controller 90 is provided using any suitable central processing unit (CPU), microcontroller, digital signal processor (DSP), etc., capable of executing software instructions stored in a computer readable media 94, e.g., memory. The computer readable media 94 can be any combination of read and write memory (RAM) and read only memory (ROM). The computer readable media 94 also comprises persistent storage, which, for example, can be any single one or combination of magnetic memory, optical memory, or solid state memory.

An input/output interface 92 is provided to allow the media broker server 2 to communicate with other entities such as the media receiver 1 and media sources 4*a-f*.

A local operator interface (not shown) is optionally provided to allow an operator to interact with the media broker server 2. The operator interface can include a display and an input device such as a keyboard, a touch function of the display and/or a positional input device such as a mouse, trackball, etc.

The media broker server 2 can be integrated in one unit, or it can be separated into several separate units, e.g. for reasons of upgradeability, media receiver proximity, ease of implementation or redundancy.

Figure 5B:
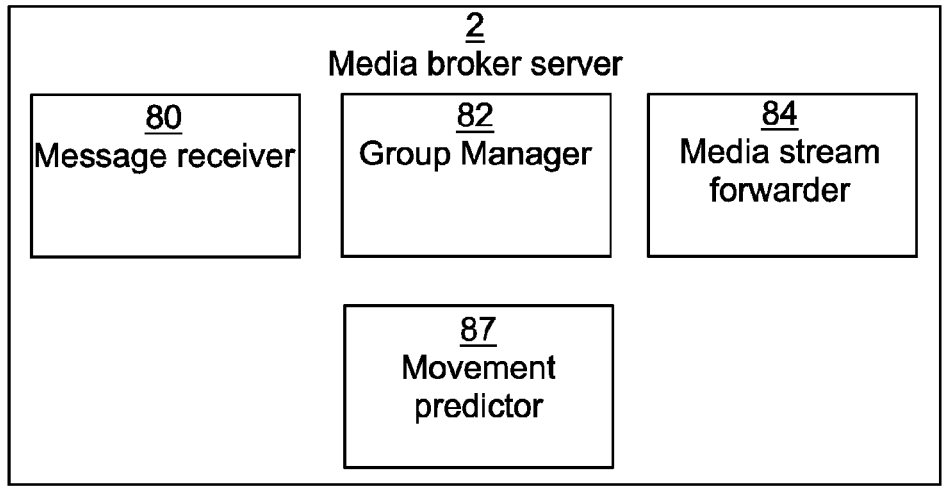
FIG. 5b is a schematic diagram showing functional modules of the media broker server of FIG. 1.

FIG. 5B is a schematic diagram showing functional modules of the media broker server 2 of FIG. 1. The modules can be implemented using software such as a computer program executing in the media broker server 2. All modules depend on an execution environment which can utilise the controller 47, computer program product 48 and/or I/O interface 49 of FIG. 4*a*. The modules implement communication of the streaming media broker 2 of FIG. 2 and correspond to the method steps of FIG. 3.

A message receiver 80 is arranged to receive the position messages from the media sources. The message receiver is also arranged to receive the request media message from the media receiver 1, the request media message comprising desired geographic position data indicating a desired geographic position of a media source.

A group manager 82 is arranged to create a matching group 7 comprising all matching media sources. The group manager 82 is arranged to dynamically maintain the matching group by removing media sources as they become unavailable, no longer match or no longer provide a media stream. Furthermore, the group manager 82 adds any new matching media sources to the matching group 7. Optionally, the group manager 82 queries each matching media source whether to accept being a media source and only adds media sources which have accepted being a media source to the matching group 7. Optionally, the group manager 82 can be arranged to update the matching group 7 with removed and added media sources to maintain matching media sources with reference to a mobile object. The group manager 82 can also be arranged to in advance query a predicted media source, predicted to match a future geographic position of the mobile object, whether to accept being a media source.

A media stream forwarder 84 is arranged to forward a live media stream captured by a media source of the matching group 7 to the media receiver 1. The media stream forwarder can be arranged to transcode the media stream from the media source to a format which is suitable for the media receiver.

An optional movement predictor 87 can be arranged to predict movement of the mobile object, and the group manager 82 is in that case arranged to query a predicted media source, predicted to match a future geographic position of the mobile object, whether to accept being a media source.

FIG. 6 shows one example of a computer program product 70 comprising computer readable means. On this computer readable means a computer program 71 can be stored, which computer program 71 can cause a controller to execute a method according to embodiments described herein. In this example, the computer program product is an optical disc, such as a CD (compact disc) or a DVD (digital versatile disc) or a Blu-Ray disc. As explained above, the computer program product could also be embodied as a memory of a device, such as memory 48 of the media broker server 2. While the computer program 71 is here schematically shown as a track on the depicted optical disk, the computer program can be stored in any way which is suitable for the computer program product.

In an optional embodiment, bandwidth can be requested in advance from mobile network operators to increase availability of live media streams for embodiments described herein. For example, if it is known that a sports event will occur at a particular location at a particular time, then requests for increased bandwidth can be sent to the mobile network operators covering the location in advance. Another example can if it is known that a big celebrity is landing at an airport at a particular time, bandwidth can be requested for that location in advance.

Using embodiments herein, media receivers are provided with a way to access a group of live video resources based on location in an anonymous manner. The system that is described enables media sources to collaboratively form a web of live media sources that becomes a single media entity for media receivers. The system is as such not about communication between two end points, but rather about communication with specific locations.

Moreover, embodiments herein allow for flexible modifications of the matching groups based on certain parameters, such as media source capabilities, expected video quality, connection status, and network capacity for the location. This lets media receivers customise the ad-hoc live video broadcasts for their individual needs, and have different group configurations for the same or overlapping locations. Using the media broker server, one single resource can form part of several concurrent matching groups and thereby be shared between media receivers.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A media broker server device for matching a media source device and a media receiver device, the media broker server device comprising:

a message receiver to receive position messages from a plurality of media source devices, the position messages comprising geographic position data indicating a geographic position of each respective media source device, the message receiver further to receive a request media message from the media receiver device, the request media message comprising desired geographic position data indicating a desired geographic position of a media source device, wherein the desired geographic position indicates a region in which media sources are of interest, and a reference to a mobile object to be tracked, the mobile object having the desired geographic position data indicating a desired geographic position of a media source device;

a group manager to create a matching group comprising all matching media source devices of the plurality of media source devices, which matching media source devices are in a geographic position matching the desired geographic position, and to update the matching group with removed and added media source devices to maintain matching media source devices with reference to the mobile object; and a media stream forwarder to forward a live media stream, captured by at least one of the matching media source devices of the matching group, to the media receiver device.

2. The media broker server device of claim 1, wherein the group manager considers it a match when at least one capability of the media source device in question matches at least one respective desired capability requested by the media receiver device.

3. The media broker server device of claim 2, wherein the at least one capability includes a media quality of the respective media source device.

4. The media broker server device of claim 2, wherein the at least one capability includes a bandwidth of at least part of a connection between the respective media source device and the media broker server device.

5. The media broker server device of claim 1, wherein the media stream forwarder forwards a live media stream from the one of the matching media source devices of the matching group which best satisfies evaluation criteria from the media receiver device.

6. The media broker server device of claim 1, wherein the group manager removes a first matching media source device from the matching group when the first matching media source device becomes unavailable for streaming media.

7. The media broker server device of claim 1, wherein the group manager removes a second matching media source device from the matching group when the second matching media source device no longer matches the desired geographic position.

8. The media broker server device of claim 1, wherein the group manager adds a new media source device to the matching group when the new media source device matches the desired geographic position.

9. The media broker server device of claim 1, wherein the group manager queries each matching media source device whether to accept being a media source device and only adds media source devices which have accepted being a media source device to the matching group.

10. The media broker server device of claim 1, wherein the group manager considers it a match when a distance between the geographic position of the media source device in question and the desired geographic position is less than a threshold distance.

11. The media broker server device of claim 1, wherein the media stream forwarder processes the media stream, comprising transcoding the media stream to a format acceptable to the media receiver device.

12. The media broker server device of claim 1, wherein a movement predictor predicts movement of the mobile object, and the group manager queries a predicted media source device that is predicted to match a future geographic position of the mobile object, whether to accept being a media source device.

13. A method for matching a media source device and a media receiver device, the method comprising the steps, performed in a media broker server device, of:
  receiving position messages from a plurality of media source devices, the position messages comprising geographic position data indicating a geographic position of each respective media source device;
  receiving a request media message from the media receiver device, the request media message comprising desired geographic position data indicating a desired geographic position of a media source device, wherein the desired geographic position indicates a region in which media sources are of interest, and a reference to a mobile object to be tracked, the mobile object having the desired geographic position data indicating a desired geographic position of a media source device;
  creating a matching group comprising all matching media source devices of the plurality of media source devices, which matching media source devices are in a geographic position matching the desired geographic position;
  forwarding a live media stream, captured by at least one of the matching media source devices of the matching group, to the media receiver device; and
  maintaining the matching group wherein the matching group is updated with removed and added media source devices to maintain matching media source devices with reference to the mobile object.

14. The method of claim 13, wherein the step of creating a matching group involves considering it a match when at least one capability of the media source device in question matches at least one respective desired capability requested by the media receiver device.

15. The method of claim 14, wherein in the step of creating a matching group, the at least one capability includes a media quality of the respective media source device.

16. The method of claim 14, wherein in the step of creating a matching group, the at least one capability includes a bandwidth of at least part of a connection between the respective media source device and the media broker server device.

17. The method of claim 13, wherein the step of forwarding forwards a live media stream from the one of the matching media source devices of the matching group which best satisfies evaluation criteria from the media receiver device.

18. The method of claim 13, wherein the step of maintaining the matching group further comprises, when a first matching media source device becomes unavailable for streaming media, removing the first matching media source device from the matching group.

19. The method of claim 13, wherein the step of maintaining the matching group further comprises, when a second matching media source device no longer matches the desired geographic position, removing the second matching media source device from the matching group.

20. The method of claim 13, wherein the step of maintaining the matching group further comprises, when a new media source device matches the desired geographic position, adding the new media source device to the matching group.

21. The method of claim 13, further comprising the step of querying each matching media source device whether to accept being a media source device and only media source devices which have accepted being a media source device are added to the matching group.

22. The method of claim 13, wherein the step of creating a matching group involves considering it a match when a distance between the geographic position of the media source device in question and the desired geographic position is less than a threshold distance.

23. The method of claim 13, wherein the step of forwarding comprises processing the media stream, comprising transcoding the media stream to a format acceptable to the media receiver device.

24. The method of claim 13, wherein a movement of the mobile object is predicted, and the step of querying a media source device whether to accept being a media source device, is performed for a predicted media source device predicted to match a future geographic position of the mobile object.

25. A non-transitory computer-readable medium having stored thereupon a computer program for a media broker server device for matching a media source device and a media receiver device, the computer program comprising computer program code which, when run on the media broker server device causes the media broker server device to:
  receive position messages from a plurality of media source devices, the position messages comprising geographic position data indicating a geographic position of each respective media source device; receive a request media message from the media receiver device, the request media message comprising desired geographic position data indicating a desired geographic position of a media source device, wherein the desired geographic position indicates a region in which media sources are of interest, and a reference to a mobile object to be tracked, the mobile object having the desired geographic position data indicating a desired geographic position of a media source device;
  create a matching group comprising all matching media source devices of the plurality of media source devices, which matching media source devices are in a geographic position matching the desired geographic position;
  forward a live media stream, captured by at least one of the matching media source devices of the matching group, to the media receiver device; and maintain the matching group wherein the matching group is updated with removed and added media source devices to maintain matching media source devices with reference to the mobile object.

* * * * *